US010202911B2

(12) United States Patent
Cunningham et al.

(10) Patent No.: US 10,202,911 B2
(45) Date of Patent: Feb. 12, 2019

(54) METHOD AND SYSTEM FOR AN ENGINE FOR DETECTION AND MITIGATION OF INSUFFICIENT TORQUE

(71) Applicant: Ford Global Technologies, LLC, Dearborn, MI (US)

(72) Inventors: Ralph Wayne Cunningham, Milan, MI (US); Ross Dykstra Pursifull, Dearborn, MI (US); Jamie Charles Hanshaw, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 434 days.

(21) Appl. No.: 13/939,104

(22) Filed: Jul. 10, 2013

(65) Prior Publication Data
US 2015/0019106 A1    Jan. 15, 2015

(51) Int. Cl.
F02D 28/00     (2006.01)
F02D 13/02     (2006.01)
(Continued)

(52) U.S. Cl.
CPC ......... F02D 28/00 (2013.01); F02D 13/0207 (2013.01); F02D 13/0215 (2013.01);
(Continued)

(58) Field of Classification Search
CPC ......... F02D 2041/001; F02D 2200/024; F02D 2200/501; F02D 17/04; F02D 13/0207; F02D 13/0265; F02D 13/08; F02D 13/0215; F02D 28/00; F02D 13/0211; F02D 13/0219; F02D 2200/023; F02P 5/1504; F02N 19/004; F02L 2001/3442; F02L 2001/3445; F02L 2001/34453;
(Continued)

(56) References Cited

U.S. PATENT DOCUMENTS 3,638,624 A * 2/1972 O'Grady .................... 123/90.18
3,692,007 A * 9/1972 Nilssen ................... F02B 67/00
                                              123/195 A (Continued)

FOREIGN PATENT DOCUMENTS

EP    1065364 A1    1/2001
EP    2157291 B1 *  2/2013 ............. F01L 1/022
(Continued)

OTHER PUBLICATIONS

Pursifull, Ross Dykstra et al., "Method and System for Increasing Vacuum, Generation by an Engine," U.S. Appl. No. 13/944,728, filed Jul. 17, 2013, 42 pages.

(Continued)

*Primary Examiner* — John Zaleskas
(74) *Attorney, Agent, or Firm* — Julia Voutyras; McCoy Russell LLP

(57) ABSTRACT

A method may include restricting cam movement while the vehicle is moving in response to an oil pressure below a threshold oil pressure, and an engine speed below a threshold engine speed, and during a vehicle stopped condition, overriding the restricted cam movement. In one example, the vehicle stopped condition may include the oil over-temperature and the load above the threshold load.

20 Claims, 6 Drawing Sheets

(51) Int. Cl.
  *F02D 13/08* (2006.01)
  *F02D 17/04* (2006.01)
  *F02P 5/15* (2006.01)
  *F02D 41/00* (2006.01)

(52) U.S. Cl.
  CPC ......... *F02D 13/0265* (2013.01); *F02D 13/08* (2013.01); *F02D 17/04* (2013.01); *F02D 2041/001* (2013.01); *F02D 2200/024* (2013.01); *F02D 2200/501* (2013.01); *F02P 5/1504* (2013.01); *Y02T 10/18* (2013.01)

(58) Field of Classification Search
  CPC ... F02L 2001/34456; F02L 2001/34459; F02L 2001/34463; F02L 2001/34466; F02L 2001/34469; F02L 2001/34473; F02L 2001/34476; F01L 2800/00; F01L 2800/01; F01L 2800/02; F01L 2800/03; F01L 2800/04; F01L 2800/05; B60W 30/18027; B60W 30/18118
  USPC ......... 123/90.15, 90.16, 90.17; 701/102, 112
  See application file for complete search history.

(56) References Cited

U.S. PATENT DOCUMENTS

| | | | |
|---|---|---|---|
| 4,480,617 A * | 11/1984 | Nakano et al. | 123/432 |
| 4,854,273 A * | 8/1989 | Uesugi et al. | 123/90.17 |
| 5,280,770 A * | 1/1994 | Satou et al. | 123/90.15 |
| 5,694,894 A * | 12/1997 | Allen | 123/90.16 |
| 5,738,056 A * | 4/1998 | Mikame et al. | 123/90.17 |
| 5,950,595 A * | 9/1999 | Yoshioka et al. | 123/295 |
| 6,196,174 B1 * | 3/2001 | Wada et al. | 123/90.15 |
| 6,257,184 B1 * | 7/2001 | Yamagishi et al. | 123/90.15 |
| 6,305,757 B1 * | 10/2001 | Ohsaki et al. | 303/114.3 |
| 6,330,870 B1 * | 12/2001 | Inoue et al. | 123/90.17 |
| 6,386,164 B1 * | 5/2002 | Mikame et al. | 123/90.17 |
| 6,408,806 B2 * | 6/2002 | Sugiyama | 123/90.12 |
| 6,412,883 B1 * | 7/2002 | Mizutani et al. | 303/114.3 |
| 6,640,758 B2 * | 11/2003 | Ashida | F01L 1/34 123/90.15 |
| 6,732,689 B2 * | 5/2004 | Wada | F01L 1/3442 123/90.15 |
| 7,661,398 B2 * | 2/2010 | Akimoto | F01L 1/3442 123/90.15 |
| 7,739,005 B1 * | 6/2010 | Tang | 701/22 |
| 7,742,852 B1 * | 6/2010 | Tang | 701/22 |
| 7,747,363 B1 * | 6/2010 | Tang | 701/22 |
| 8,355,856 B2 * | 1/2013 | Hartrey et al. | 701/102 |
| 2002/0139333 A1 * | 10/2002 | Kusano | F01L 1/34 123/90.17 |
| 2003/0200943 A1 * | 10/2003 | Wada | F01L 1/3442 123/90.15 |
| 2003/0230265 A1 * | 12/2003 | Taylor | F01L 1/34 123/90.15 |
| 2004/0129239 A1 * | 7/2004 | Yoshikawa et al. | 123/90.17 |
| 2005/0022761 A1 * | 2/2005 | Asami et al. | 123/90.16 |
| 2005/0051122 A1 * | 3/2005 | Hirowatari | F01L 1/3442 123/90.17 |
| 2005/0211212 A1 * | 9/2005 | Novak | 123/90.34 |
| 2006/0102125 A1 * | 5/2006 | Mashiki | F01L 1/352 123/179.4 |
| 2007/0204816 A1 * | 9/2007 | Russell | F01L 13/04 123/90.12 |
| 2007/0204817 A1 * | 9/2007 | Russell | B60K 6/12 123/90.12 |
| 2007/0209618 A1 * | 9/2007 | Leone | B60K 6/24 123/90.12 |
| 2007/0209619 A1 * | 9/2007 | Leone | B60W 10/06 123/90.12 |
| 2009/0093940 A1 * | 4/2009 | Ichimoto | B60K 6/445 701/102 |
| 2009/0183706 A1 * | 7/2009 | Miwa | B60K 6/445 123/179.3 |
| 2009/0205889 A1 * | 8/2009 | Leone | B60W 10/06 180/65.265 |
| 2009/0235883 A1 * | 9/2009 | Watanabe | 123/90.15 |
| 2009/0272351 A1 * | 11/2009 | Ezaki | F01L 9/04 123/90.17 |
| 2010/0036564 A1 * | 2/2010 | Blaise et al. | 701/42 |
| 2010/0059006 A1 * | 3/2010 | Maehara | 123/90.17 |
| 2010/0175649 A1 * | 7/2010 | Suzuki | F01L 1/022 123/90.17 |
| 2010/0192883 A1 * | 8/2010 | Tomimatsu | F01L 1/053 123/90.15 |
| 2010/0275877 A1 * | 11/2010 | Ramappan et al. | 123/295 |
| 2010/0300386 A1 * | 12/2010 | Asami | F01L 1/3442 123/90.15 |
| 2010/0313833 A1 * | 12/2010 | Miyanoo | F01L 1/3442 123/90.15 |
| 2011/0041458 A1 | 2/2011 | Yu Chen | |
| 2011/0048346 A1 * | 3/2011 | Crowe | F01L 1/3442 123/90.12 |
| 2011/0107992 A1 * | 5/2011 | Murata | 123/90.17 |
| 2011/0232594 A1 * | 9/2011 | Miyachi | F01M 1/16 123/90.15 |
| 2011/0232595 A1 * | 9/2011 | Kokubo et al. | 123/90.17 |
| 2011/0239988 A1 * | 10/2011 | Reiche | F02P 5/1506 123/406.76 |
| 2011/0253084 A1 * | 10/2011 | Ting et al. | 123/90.16 |
| 2012/0073531 A1 * | 3/2012 | Urushihata | F01L 1/3442 123/90.15 |
| 2012/0145098 A1 * | 6/2012 | Crowe | F01L 1/3442 123/90.12 |
| 2012/0291728 A1 * | 11/2012 | Mehring | F01M 1/16 123/90.12 |
| 2012/0316751 A1 * | 12/2012 | Eastwood et al. | 701/102 |
| 2012/0323401 A1 * | 12/2012 | McGrogan | 701/1 |
| 2013/0323401 A1 | 12/2013 | Samoto et al. | |
| 2014/0069360 A1 * | 3/2014 | Kobayashi et al. | 123/90.15 |
| 2014/0283643 A1 * | 9/2014 | Watanabe | 74/568 R |
| 2014/0283770 A1 * | 9/2014 | Watanabe | 123/90.15 |
| 2015/0114329 A1 * | 4/2015 | Kobayashi | 123/90.15 |

FOREIGN PATENT DOCUMENTS

| | | | | |
|---|---|---|---|---|
| JP | 2007153212 A | * | 6/2007 | |
| JP | 2013043605 A | * | 3/2013 | |

OTHER PUBLICATIONS

Pursifull, Ross D. et al, "Method for Increasing Vacuum Production for a Vehicle," U.S. Appl. No. 14/269,954, filed May 5, 2014, 33 pages.

* cited by examiner

METHOD AND SYSTEM FOR AN ENGINE FOR DETECTION AND MITIGATION OF INSUFFICIENT TORQUE

FIELD

The present disclosure relates to methods and systems for operating an internal combustion engine.

BACKGROUND AND SUMMARY

Variable valve timing is utilized in vehicles with internal combustion engines to control the timing of engine cylinder valves in order to raise engine performance, increase fuel economy, increase drivability, and reduce emissions. Variable valve timing systems can be hydraulically controlled, an electronic controller of a powertrain control module directing high pressure oil to actuate oil pressure actuated cams for altering the valve timing.

The inventors herein have recognized various issues with the above system. In particular, powertrain control modules typically restrict cam movement at low oil pressure conditions, due to reduced cam controllability robustness. This restricted cam movement is disadvantageous under certain conditions, as it can render a vehicle unable to generate sufficient torque. For example, after towing a heavy load up a long incline, upon stopping a vehicle, an operator may be unable to launch a vehicle despite fully depressing the accelerator pedal due to the low engine speed and high oil temperature, which leads to low oil pressure. In this example, the powertrain control module restricts cam movement due to a low oil pressure inferred from the high oil temperature, and the engine speed is restricted by the torque converter, which stalls at a low engine speed. Consequently, the vehicle is immobilized because sufficient torque is not generated to launch the vehicle. In other examples, insufficient torque to launch a vehicle may occur under driving conditions including one or more of high altitude, ascending an incline, and towing a trailer, when at near-zero vehicle speed.

One approach that at least partially addresses the above issues is a method, comprising in response to a first condition comprising an oil pressure below a threshold oil pressure and an engine speed below a threshold engine speed, restricting cam movement while the vehicle is moving, and during a vehicle stopped condition, overriding the restricted cam movement. In another embodiment, a method comprises during a first vehicle moving condition, adjusting cam timing responsive to a requested torque and a requested vehicle speed, but irrespective of an available torque, and limiting cam timing adjustment responsive to oil overtemperature at increased loads. Furthermore, during a second condition following the first condition, the method comprises overriding the cam timing adjustment limits in response to the available torque being insufficient to meet the requested torque. In this way, it is possible to achieve the technical result of repositioning the cams via a variable valve timing system to increase available torque, even during a condition, when an oil pressure or an inferred oil pressure based on oil temperature may be low. In particular, in response to vehicle conditions, the method can supersede conventional cam repositioning control strategies based on inferred or actual oil pressure, in order to increase available torque.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to a system and method for an internal combustion engine comprising restricting cam movement during a first condition, and overriding cam movement restrictions responsive to a second condition. The second condition may comprise an oil temperature being above a threshold oil temperature, and a vehicle being stopped. Furthermore, the second condition may comprise an available torque being less than a requested torque by more than a threshold torque difference. For example, during the second condition, the vehicle may be immobilized having insufficient available torque (or insufficient intake vacuum at the intake manifold) to launch the vehicle or to operate a front end accessory drive. In this way, available torque (or insufficient intake vacuum) may be increased in response to the second condition, enabling a vehicle to overcome an inability to launch. Further still, the method described herein may maintain engine manufacturing costs and manufacturing complexity. Accordingly, launching or mobilizing a vehicle in response to an available torque being less than a requested torque by more than a threshold torque difference supersedes maintaining fuel economy, reducing fuel emissions, and maintaining vehicle driveability. Furthermore, available torque may also be increased by repositioning cams to increase engine volumetric efficiency. Further actions to increase available torque irrespective of maintaining fuel economy, reducing fuel emissions, and maintaining vehicle driveability may include shedding front end accessory drive loads, downshifting to a lower gear, enriching air to fuel ratio, closing a wastegate valve, operating with a full throttle, advancing a spark timing to maximum brake torque, reducing air charge temperature, releasing brakes, and engaging a supercharger.

Figure 1:
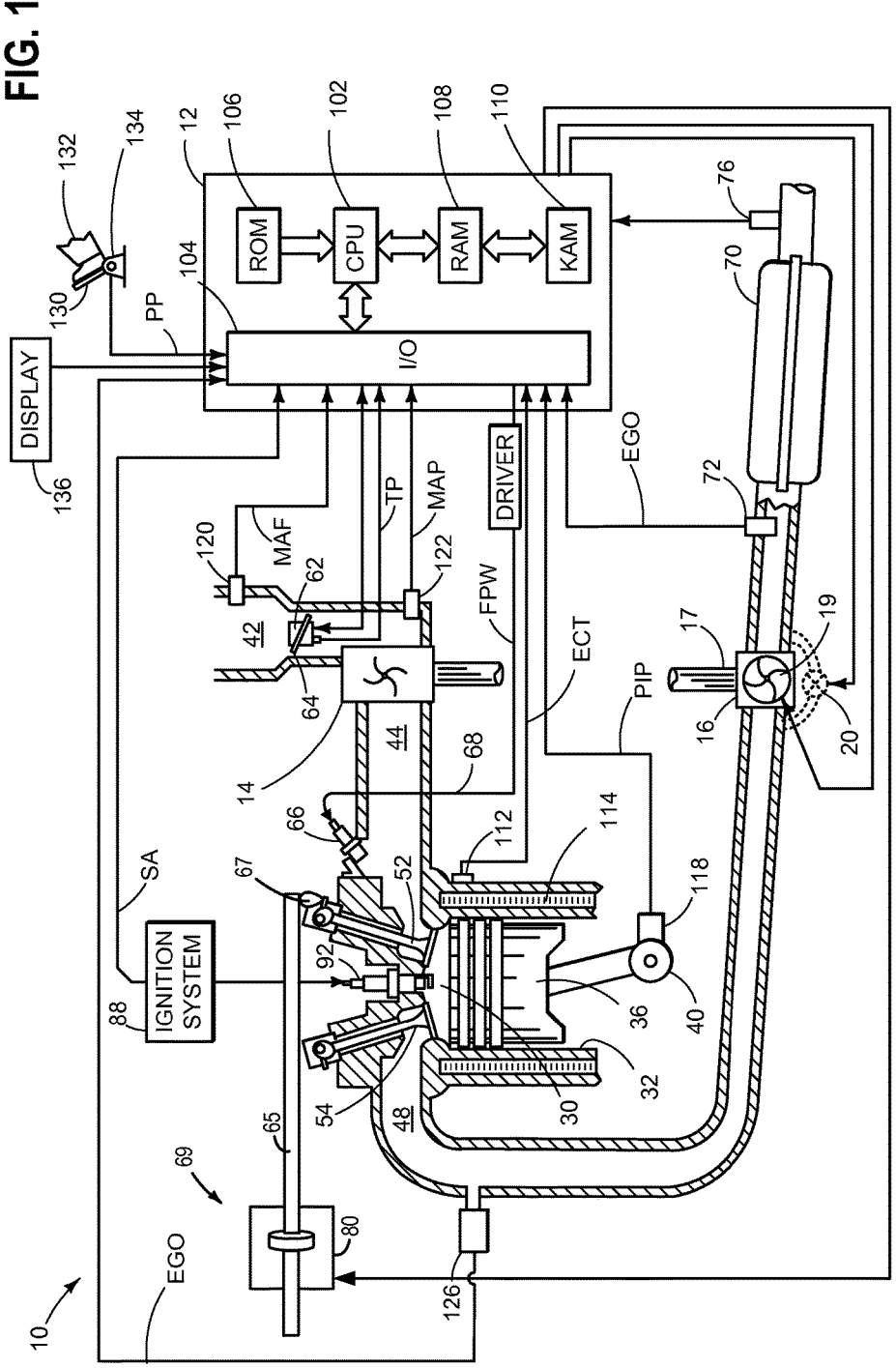
FIG. 1 shows a schematic diagram of an example engine including a variable valve timing system.
Figure 5:
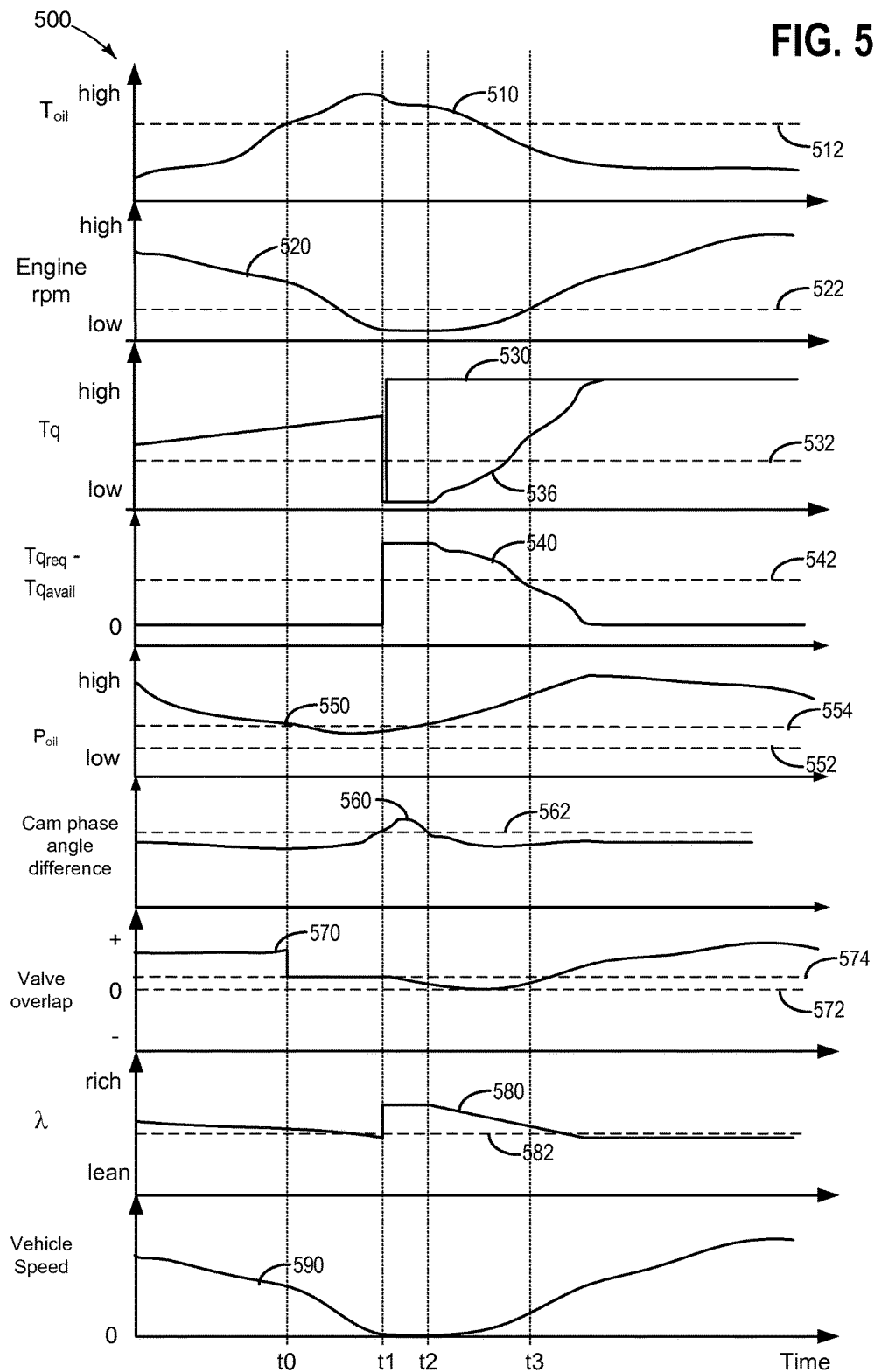
FIG. 5 shows an example timeline for repositioning cams for an engine in response to a first condition and a second condition.
Figure 6:
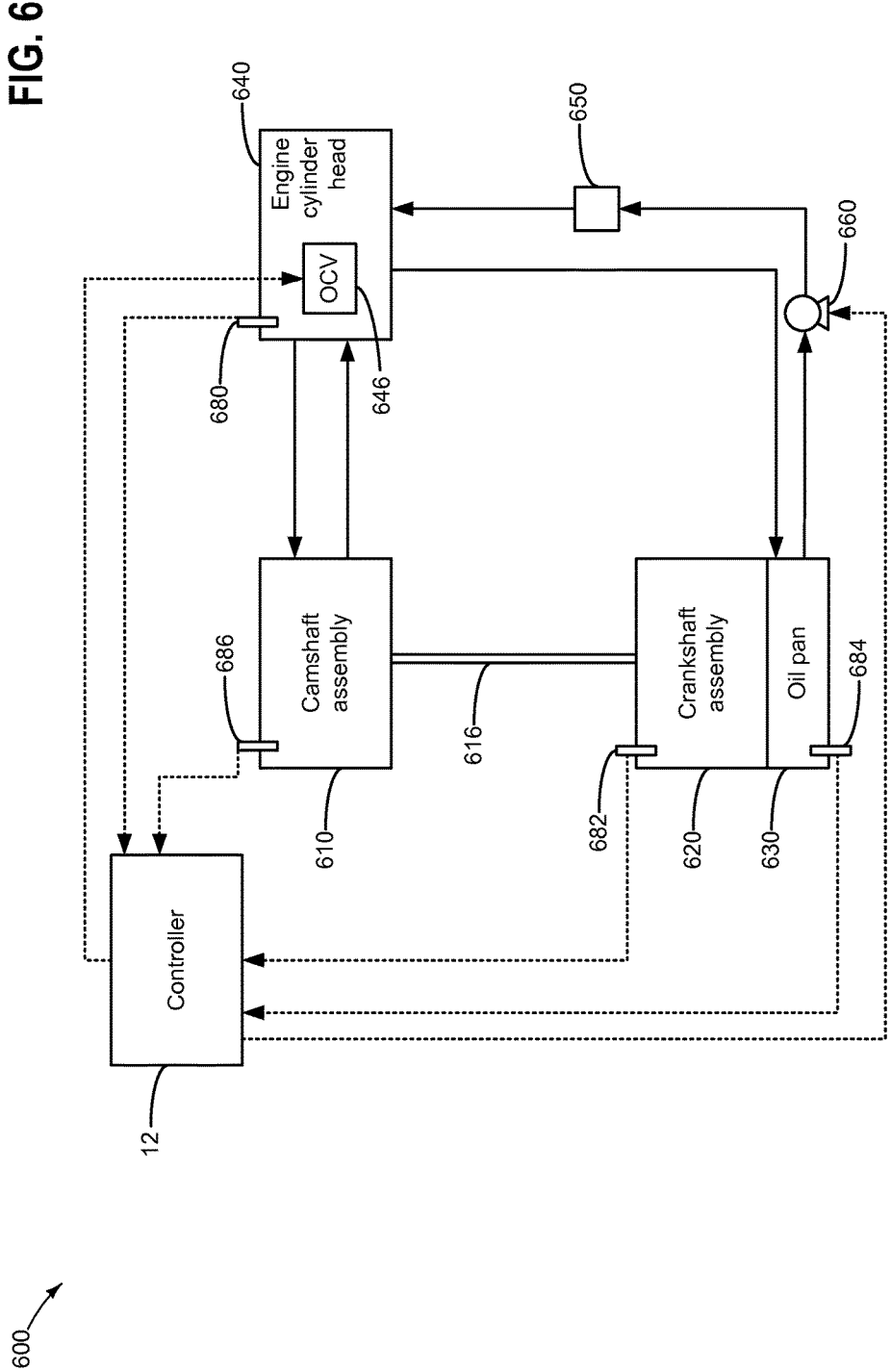
FIG. 6 shows a schematic of an example system for controlling cam position.

FIG. 1 shows an example engine internal combustion engine comprising a controller, and a variable valve timing system, and FIG. 6 shows a schematic of an example system for controlling cam position. FIGS. 2, 3A, 3B, and 4 show flow charts of a method for repositioning cams in response to the first condition. FIG. 5 illustrates a timeline showing variations in engine operating conditions while executing said method.

Turning to FIG. 1, a schematic diagram showing one cylinder of multi-cylinder engine 10, which may be included in a propulsion system of a vehicle, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. A pedal position of an accelerator pedal may be used to indicate a requested torque, $Tq_{req}$, to controller 12 via pedal position sensor 134. Combustion chamber (e.g., cylinder) 30 of engine 10 may include combustion chamber walls 32 with piston 36 positioned therein. Piston 36 may be coupled to crankshaft 40 so that a reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10. A drive wheel speed may indicate an available torque, $Tq_{avail}$ from the engine 10. Furthermore, the drive wheel speed and the accelerator pedal position sensor 134 may together indicate the available torque in relation to the requested torque.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Fuel injector 66 is shown arranged in intake passage 42 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection. In some cases, direct injection may provide increased cooling engine cylinders which can reduce knocking and allow for higher compression ratios and increased engine efficiency as compared to operation without direct fuel injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, particulate filter, various other emission control devices, or combinations thereof. As an example, an engine may be operated at an overall stoichiometric air-fuel ratio in order to reduce NOx emissions. In some embodiments, during operation of engine 10, emission control device 70 may be periodically reset by operating at least one cylinder of the engine within a particular air/fuel ratio.

Full-volume exhaust gas sensor 76 is shown coupled to exhaust passage 48 downstream of emission control device 70. Sensor 76 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Further, a plurality of exhaust gas sensors may be located at partial volume locations within the emission control devices. Other sensors 72 such as an air mass (AM) sensor, additional EGO sensor, and/or a temperature sensor may be disposed upstream of emission control device 70 to monitor the AM, oxygen content, and temperature, respectively, of the exhaust gas entering the emission control device. The sensor locations shown in FIG. 1 are just one example of various possible configurations. For example, the emission control system may include a partial volume set-up with close coupled catalysts.

Compressor 14 draws air from air intake passage 42 to supply boost intake passage 42. Exhaust-gases spin turbine 16 which is coupled to compressor 14 via shaft 17. In some examples, a charge or intake air cooler may also be provided (not shown). Compressor speed may be adjusted via adjusting a position of variable vane control or compressor bypass valve. In alternative examples, a waste gate 20 may replace or be used in addition to variable vane control. Variable vane control may adjust a position of variable geometry vanes 19 of turbine 16. Exhaust-gases can pass through turbine 16 supplying little energy to rotate turbine 16 when vanes 19 are in an open position. Exhaust-gases can pass through turbine 16 and impart increased force on turbine 16 when vanes 19 are in a closed position. Alternatively, waste gate 20 allows exhaust-gases to flow around turbine 16 so as to reduce the amount of energy supplied to the turbine 16. Furthermore, turbine 16 may be a turbine with fixed geometry. A compressor bypass valve (not shown) may allow compressed air at the outlet of compressor 14 to be returned to the input of compressor 14. In this way, the efficiency of compressor 14 may be reduced so as to affect the flow of compressor 14 and reduce the possibility of compressor surge. In this way, the engine may comprise a turbocharged engine. In other examples, the engine may comprise a supercharged engine, wherein a supercharger compressor 14 is used to compress the intake air, but the compressor is not coupled to a shaft and is not driven by an exhaust turbine. Power for a supercharger compressor can be provided mechanically by a belt, gear, shaft, or chain connected to the engine's crankshaft, for example.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; AM and/or temperature of the exhaust gas entering the catalyst from sensor 72; exhaust gas air to fuel ratio from sensor 76; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque (e.g., available torque). Further, this sensor, along with the detected engine speed, can provide an estimate of charge (including air) inducted into the cylinder. In one example, sensor 118, which is also used as an engine speed sensor, may produce a predetermined number of equally spaced pulses for each revolution of the crankshaft. Additionally, controller 12 may communicate with a cluster display device 136, for example to alert the driver of faults in the engine or exhaust after-treatment system.

Storage medium read-only memory 106 can be programmed with computer readable data representing instructions executable by processor 102 for performing the methods described below as well as other variants that are anticipated but not specifically listed.

Each combustion chamber (e.g., cylinder) 30 may be serviced by one or more valves. In the present example, each cylinder 30 includes a corresponding intake valve 52 and an exhaust valve 54. Engine 10 further includes one or more camshafts 65 for operating intake valve 52 and/or exhaust valve 54. In the depicted example, intake camshaft 65 is coupled to intake valve 52 and can be actuated to operate intake valve 52. In some embodiments, where the intake valve of a plurality of cylinders 30 are coupled to a common intake camshaft, the common intake camshaft can be actuated to operate the intake valves of all the coupled cylinders.

Intake valve 52 is actuatable between an open position that allows intake air into the corresponding cylinder and a closed position substantially blocking intake air from the cylinder. Intake camshaft 65 may be included in intake valve actuation system 69. Intake camshaft 65 includes intake cam 67 which has a cam lobe profile for opening intake valve 52 for a defined intake duration. In some embodiments (not shown), the camshaft may include additional intake cams with an alternate cam lobe profile that allows the intake valve 52 to be opened for an alternate duration (herein also referred to as a cam profile switching system). Based on the lobe profile of the additional cam, the alternate duration may be longer or shorter than the defined intake duration of intake cam 67. The lobe profile may affect cam lift height, cam duration, and/or cam timing. A controller may be able to switch the intake valve duration by moving intake camshaft 65 longitudinally and switching between cam profiles.

In the same manner, each exhaust valve 54 is actuatable between an open position allowing exhaust gas out of the corresponding cylinder and a closed position substantially retaining gas within the cylinder. It will be appreciated that while only intake valve 52 is shown to be cam-actuated, exhaust valve 54 may also be actuated by a similar exhaust camshaft (not shown). In some embodiments, where the exhaust valve of a plurality of cylinders 30 is coupled to a common camshaft, the exhaust camshaft can be actuated to operate the exhaust valves of all the coupled cylinders. As with intake camshaft 65, when included, the exhaust camshaft may include an exhaust cam having a cam lobe profile for opening exhaust valve 54 for a defined exhaust duration. In some embodiments, the exhaust camshaft may further include additional exhaust cams with an alternate cam lobe profile that allows exhaust valve 54 to be opened for an alternate duration. The lobe profile may affect cam lift height, cam duration, and/or cam timing. A controller may be able to switch the exhaust valve duration by moving the exhaust camshaft longitudinally and switching between cam profiles.

It will be appreciated that the intake and/or exhaust camshafts may be coupled to cylinder subsets, and multiple intake and/or exhaust camshafts may be present. For example, a first intake camshaft may be coupled to the intake valves of a first subset of cylinders while a second intake camshaft may be coupled to the intake valves of a second subset of cylinders. Likewise, a first exhaust camshaft may be coupled to the exhaust valves of a first subset of cylinders while a second exhaust camshaft may be coupled to the exhaust valves of a second subset of cylinders. Further still, one or more intake valves and exhaust valves may be coupled to each camshaft. The subset of cylinders coupled to the camshaft may be based on their position along an engine block, their firing order, the engine configuration, etc.

Intake valve actuation system 69 and exhaust valve actuation system (not shown) may further include push rods, rocker arms, tappets, etc. Such devices and features may control actuation of the intake valve 52 and the exhaust valve 54 by converting rotational motion of the cams into translational motion of the valves. As previously discussed, the valves can also be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 30 may each have more than one exhaust valve and/or intake valve. In still other examples, each of the exhaust valve 54 and intake valve 52 of one or more cylinders may be actuated by a common camshaft. Further still, in some examples, some of the intake valves 52 and/or exhaust valves 54 may be actuated by their own independent camshaft or other device.

Engine 10 may include variable valve timing (VVT) systems, for example, variable cam timing (VCT) system 80. A variable valve timing system may be configured to open an intake valve for a first duration and an exhaust valve for a second duration. The first and second duration may be based on engine operating conditions. In one example, the first and second durations may be adjusted based on engine speed, oil temperature, a requested torque, and an available torque.

VCT system 80 may be a twin independent variable camshaft timing system, for changing intake valve timing and exhaust valve timing independently of each other. VCT system 80 may include an intake camshaft phaser coupled to the common intake camshaft 65 for changing intake valve timing. The VCT system may likewise include an exhaust camshaft phaser coupled to a common exhaust camshaft for changing exhaust valve timing. VCT system 80 may be configured to advance or retard valve timing by advancing or retarding cam timing and may be controlled by controller 12. VCT system 80 may be configured to vary the timing of valve opening and closing events by varying the relationship between the crankshaft position and the camshaft position. For example, VCT system 80 may be configured to rotate intake camshaft 65 independently of the crankshaft to cause the valve timing to be advanced or retarded. In some embodiments, controller 12 may advance or retard cam timing via VCT system 80 by adjusting an oil pressure to oil-pressure actuated (OPA) cam phasers. The VCT system 80 may supply oil pressure to the OPA cam phasers, as examples, via a mechanical oil pump or via a cam-torque-actuated (CTA) device configured to rapidly vary the cam timing. In some embodiments, valve timing such as intake valve closing (IVC) and exhaust valve closing (EVC) may be varied by a continuously variable valve lift (CVVL) device.

The valve/cam control devices and systems described above may be hydraulically powered, or electrically actuated, or combinations thereof. In one example, a position of the camshaft may be changed via cam phase adjustment of an electrical actuator (e.g., an electrically actuated cam phaser) with a fidelity that exceeds that of most hydraulically operated cam phasers. Signal lines can send control signals to and receive a cam timing and/or cam selection measurement from VCT system 80.

By adjusting VCT system 80, a position of intake camshaft 65 can be adjusted to thereby vary an opening and/or closing timing of intake valve 52. As such, by varying the opening and closing of intake valve 52, an amount of positive valve overlap between intake valve 52 and exhaust valve 54 can be varied. For example, VCT system 80 may be adjusted to advance or retard an opening and/or a closing of intake valve 52 relative to a piston position. VCT system 80 may also comprise a cam position sensor for detecting the position of a cam. The cam position sensor may also determine the rate of change of the cam position, from which the direction of the cam movement may be determined. For example, the cam position sensor may determine if a cam is moving towards a new cam position (e.g., away from the default pinned position), or towards the default pinned position (e.g., away from the new cam position. Furthermore, the cam position sensor may be able to detect the position of multiple cams so that a degree of cam synchronization between multiple cams can be determined. For example, by measuring instantaneous cam positions and/or rates of change of cam positions, the cam position sensor can determine the degree of synchronization between multiple cams.

During engine operation, a cylinder piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke. During cylinder combustion, an exhaust valve may be opened just as the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced.

Based on the timing differences between exhaust valve closing and intake valve opening, the valves may be operated with negative valve overlap wherein for a short duration after the end of the exhaust stroke and before the commencement of the intake stroke, both intake and exhaust valves are closed. This period, during which both valves are closed, is referred to as negative (intake to exhaust) valve overlap. In one example, the VCT system may be adjusted so that the negative intake to exhaust valve overlap timing may be a default cam position of the engine during cylinder combustion.

Alternatively, the valves may be operated with positive valve overlap wherein for a short duration before the end of the exhaust stroke and after the commencement of the intake stroke, both intake and exhaust valves may be open. This period, during which both valves may be open, is referred to as a positive (intake to exhaust) valve overlap. As elaborated herein, the VCT system 80 may be adjusted so that an amount of positive valve overlap during selected engine operating conditions is increased. Specifically, a position of the intake camshaft may be adjusted such that an opening of the intake valve timing is advanced. Consequently, the intake valve may be opened earlier, before the end of the exhaust stroke. As such, a duration over which both valves are open may be increased, thereby leading to increased positive valve overlap. As one example, positive valve overlap may be increased by moving the intake camshaft from a position of some positive valve overlap to a position having more positive valve overlap. As another example, positive valve overlap may be increased by moving the intake camshaft from a position of negative valve overlap to a position of positive valve overlap. In one example, the VCT system may be adjusted so that the negative intake to exhaust valve overlap timing may be a default cam position of the engine during an engine cold-start.

It will be appreciated that while the above example suggests increasing positive valve overlap by advancing intake opening timing, in alternate examples, positive valve overlap may be increased by adjusting an exhaust camshaft to retard exhaust valve closing. Further still, each of the intake and the exhaust camshafts may be adjusted to vary the positive valve overlap by varying both the intake and the exhaust valve timings.

FIG. 1 also shows a controller 12, which may be any electronic control system of the vehicle in which engine 10 is installed. In embodiments where at least one intake or exhaust valve is configured to open and close according to an adjustable timing, the adjustable timing may be controlled via the electronic control system to regulate an amount of exhaust present in a combustion chamber during ignition. For example, positive valve overlap may be increased in order to scavenge combusted exhaust gases from the engine cylinders.

The electronic control system may also be configured to command the opening, closure and/or adjustment of various other electronically actuated valves in the engine 10 as needed to enact any of the control functions described herein. These valves may include throttle valves, compressor by-pass valves, waste gates, EGR valves and shut-off valves, various reservoir intake and exhaust valves, for example. The controller may also adjust the amount of fuel, as well as injection timing, of the fuel injectors. As such, the controller may adjust the VCT system and an air-fuel ratio. Further, to assess operating conditions in connection with the control functions of the engine 10, the controller may be operatively coupled to a plurality of sensors arranged throughout the engine 10. These may include flow sensors, temperature sensors, pedal-position sensors, pressure sensors, a mass air flow sensor, etc. Specifically, a pedal position sensor 134 is shown coupled to an accelerator pedal 130 for sensing force applied by vehicle operator 132. The controller 12 may use data from these various sensors to estimate other engine operating conditions.

Turning now to FIG. 6, it illustrates a simplified schematic showing oil flow paths (solid line arrows) in an engine system 600 for controlling cam repositioning for an engine including VVT. Engine system 600 includes controller 12, camshaft assembly 610, crankshaft assembly 620, oil pan 630, and engine cylinder head 640. The camshaft assembly 610 includes the camshaft (including intake and exhaust camshafts), and OPA cams including variable cam timing actuators. The crankshaft assembly 620 is coupled to the camshaft assembly via a belt or chain 616. Oil from an oil pan 630 is pumped through an oil pump 660 through an oil filter 650 to the engine cylinder head 640. An oil control valve (OCV) 646 is controlled by controller 12 to supply and/or drain oil from the OPA cam actuators to advance or retard the timing of the cams in the camshaft assembly 610. Optionally, a check valve (not shown) may be included between the camshaft assembly 610 and the OCV 646 to prevent independent backflow of oil from the cams to the engine cylinder head, and subsequent movement of cams, when the oil pressure is low. Oil from the engine cylinder head 640 drains back to the oil pan 630. Furthermore, oil pump 660 may be a variable displacement oil pump in a variable oil pressure system, and controller 12 may control the ouput of oil pump 660 to increase or decrease oil pressure.

Oil pressure may vary depending on several factors. Oil pressure can vary depending on oil viscosity, which itself may depend on oil temperature (e.g. oil viscosity increases as oil temperature decreases). Furthermore, oil pressure may be increased by increasing oil pump speed, which may be proportional to engine speed, and by increasing oil pump displacement. Further still, oil pressure may decrease with increasing oil leakage, which can vary with manufacturing tolerances and engine wear, and with increasing oil consumption by auxiliary devices such as devices (e.g. piston oil squirters) supplying oil for piston lubrication. In this manner, oil pressure may be inferred based on one or a combination of oil temperature, engine speed, oil pump displacement, and the state of oil consuming devices in the system.

The controller 12 may operate in an open-loop manner with respect to cam repositioning control, by operating OCV to reposition (e.g., advance or retard) the cams based on an oil pressure. The oil pressure may be inferred from oil temperature, which is measured using an oil temperature sensor 684. Optionally, oil pressure may be indicated by an oil pressure sensor positioned inline with the engine oil flow path. Open-loop control of the OPA cams may be suitable when the oil temperature is below a threshold temperature, oil pressure may be high enough to ensure stable and responsive cam repositioning. Alternately, the controller 12 may operate in a closed-loop manner with respect to cam repositioning control by determining cam positions from one or more cam angle sensors 686. Crankshaft position may further be determined from a crankshaft angle sensor 682, and engine load may be determined from sensor 680. As an example, sensor 680 may infer engine load by measuring intake oxygen levels. By determining the cam positions over a time interval, controller 12 may determine cam movement direction, for example, if a cam is moving away from or towards a default cam pinned position. Furthermore, controller 12 may determine if a cam is moving in a stable manner, without changing direction. As an example, controller 12 may include cam diagnostics that detect if controller commanded cam positions and controller commanded cam rates match the actual cam positions and the actual cam rates, respectively. Further still, controller 12 may determine if multiple cams are moving in synchronization with respect to one another, whether their synchronization is increasing or decreasing, and whether they are in synchronization within or beyond a cam synchronization threshold. Further still, controller 12 may determine the rate of change of synchronization between multiple cams. Accordingly, instantaneous and aggregate cam position measurements from one or more cams may be input to controller 12 and utilized to calculate feedback control actions for executing cam repositioning control. In one example, when oil pressure is low (e.g., due to high oil temperatures), the controller cam diagnostics may detect degraded cam control (e.g., actual cam rates and positions do not match controller commanded cam rates and positions). As such, controller may disable cam control, returning cam positions to default pinned or holding positions in order to maintain driveability.

Under typical driving conditions when the engine speed is above a threshold engine speed (e.g. a low idle speed), where oil temperature is below a threshold oil temperature (e.g., no oil over-temperature), and a load may be below a threshold load, controller 12 adjusts cam timing via VCT system 80 responsive to a requested torque and a requested vehicle speed. As an example, the requested vehicle speed and the requested torque may be indicated by the accelerator pedal 130 position. Furthermore, as vehicle speed and requested torque increase, cam timing may be adjusted so that intake valves remain open for longer durations to increase air intake to the engine. As an example, intake valve closing may be retarded at higher vehicle speeds. During these typical driving conditions, oil pressure is inferred from the oil temperature (or measured directly), and oil pressure is sufficient to reliably control and reposition the cams to adjust cam timing and to provide the requested torque (e.g., available torque closely matches the requested torque). As such, during these typical driving conditions, the cam timing is adjusted in an open-loop manner based on the inferred oil pressure, and irrespective of the available torque.

On the other hand, controller 12 may restrict cam movement and limit cam timing adjustment during a first driving condition. For example, cam timing adjustment may be limited responsive to oil over-temperature conditions (e.g. oil temperature greater than a threshold oil temperature) and decreased engine speeds (e.g. below a threshold engine speed). Cam timing adjustment may also be limited responsive to increased loads (e.g., load greater than a threshold load). During these conditions, inferred oil pressure decreases (e.g., due to high oil temperatures) and cam timing control may be unreliable. For example, due to low oil pressure, cam timing may change slowly, cams may move unsynchronously, and cam positions may move unstably, oscillating toward and away from a desired position. As a result, during oil over-temperature conditions and decreased engine speeds (and increased loads above a threshold load), the available torque may be insufficient to meet the requested torque. However, in spite of the available torque being insufficient to provide the requested torque, cam timing adjustment may be limited in order to maintain vehicle drivability, vehicle operability, fuel economy, and vehicle emissions. Limiting cam timing adjustment or restricting cam movement can include pinning the cams to their default cam positions. Furthermore, during oil over-temperature, oil pressure may not be sufficient to unpin cams from their default pinned positions.

During a second condition, when the requested torque far exceeds the available torque (e.g., the requested torque exceeds the available torque beyond a threshold torque difference), controller 12 may override cam timing adjustment limits. For example, if a vehicle is stopped, and an available torque is insufficient to launch a vehicle or to operate a front end accessory drive, the cam timing adjustment limits may be overridden. In this case, because the vehicle is immobilized, maintaining vehicle drivability, vehicle operability, fuel economy, and vehicle emissions become secondary to launching the vehicle (or operating a front end accessory drive). Thus controller 12 may proceed with adjusting the cam timing to increase available torque despite slow cam repositioning, unsynchronized cam repositioning, and unstable cam repositioning. Furthermore, while overriding cam timing adjustment limits, cam position control may no longer be open-loop based on the inferred oil pressure, but may be closed-loop, the controller 12 determining cam position control actions based on measurements of cam positions, cam repositioning rate, cam synchronization, cam movement direction relative to a desired position or a default pinned position, cam repositioning stability, and the like. Cam position closed-loop control may also include retarding faster cams in order to improve synchronization with slower cams.

Accordingly, during typical driving conditions, controller 12 does not limit cam timing adjustment, and cam timing is controlled in an open-loop manner, based on an inferred oil pressure, the oil pressure being sufficient to reliably control the cam positions. Furthermore, during a first condition responsive to oil over-temperature and increased loads, controller 12 may restrict cam movement. During the second condition, when the available torque is insufficient to provide the requested torque (e.g., to launch the vehicle), controller 12 may override the cam movement restrictions and control cam timing in a closed-loop manner, based on cam position, cam repositioning rates, and the like. Upon exiting the second condition, controller 12 returns to open-loop cam timing control to maintain vehicle drivability and operability.

In this manner, a vehicle may comprise an engine, an oil pressure actuated cam, and a controller with executable instructions to, during a first vehicle moving condition, adjusting cam timing responsive to a requested torque and a requested vehicle speed, but irrespective of an available torque, and limiting cam timing adjustment responsive to oil over-temperature at increased loads, and during a second condition following the first condition, overriding the cam timing adjustment limits in response to the available torque being insufficient to meet the requested torque.

Figure 2:
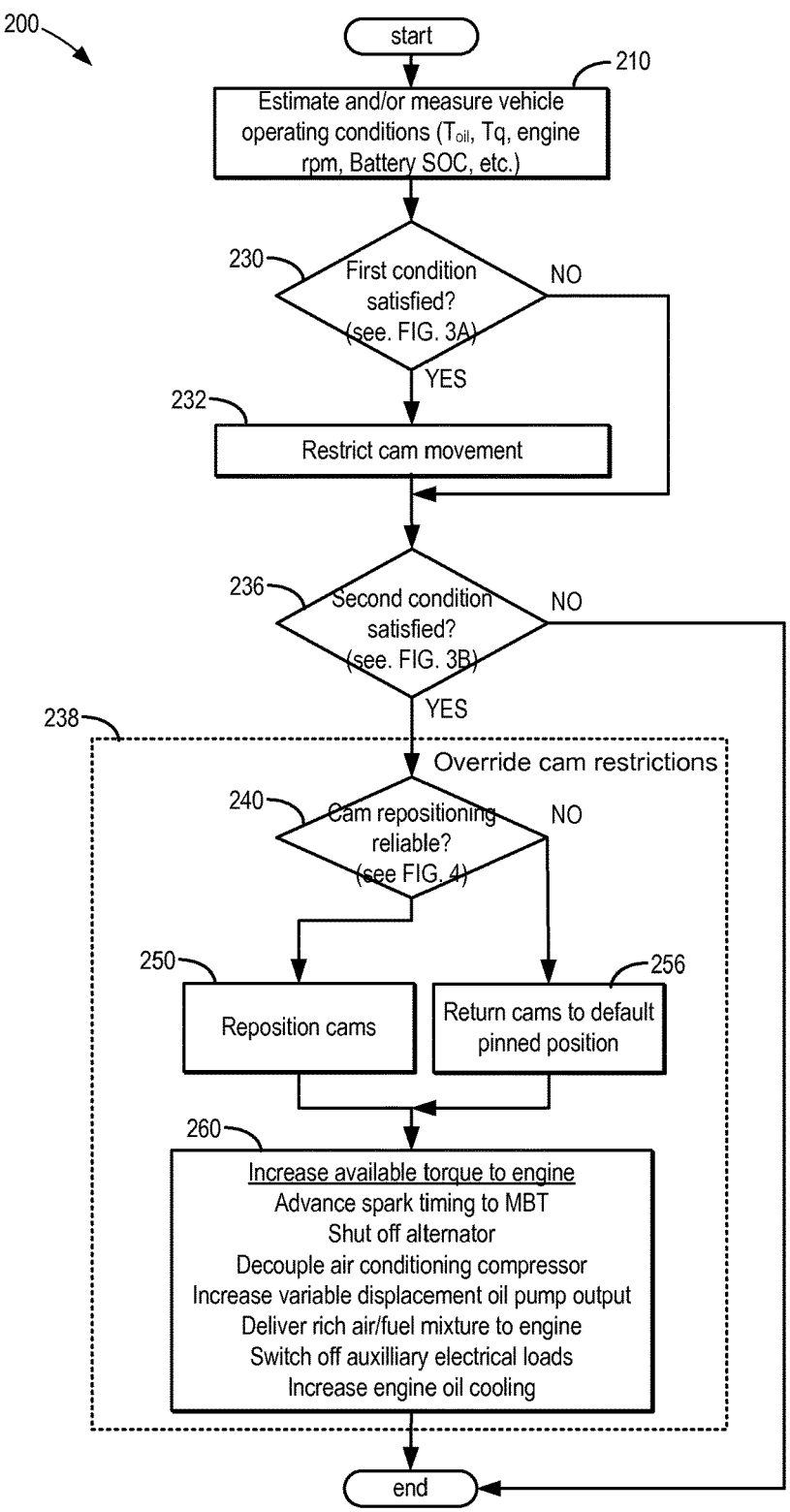
FIGS. 2, 3A, 3B, and 4 show flow charts of an example method for repositioning cams for an engine in response to a first condition and a second condition.

Turning now to FIG. 2, it illustrates a flow chart for a method 200 of repositioning cams in response to a first condition and a second condition. Method 200 may be utilized for repositioning intake cams, repositioning exhaust cams, or a suitable combination thereof. Method 200 begins at 210, where it estimates and/or measures vehicle operating conditions such as oil temperature ($T_{oil}$), available torque ($Tq_{avail}$), requested Torque ($Tq_{req}$), oil pressure ($P_{oil}$), engine speed (engine rpm), load, cam synchronization, valve overlap, air/fuel ratio, vehicle speed, and the like. Accelerator pedal position sensor 134 and drive wheel speed may be used to indicate $Tq_{req}$ and T respectively. Next, at 230, method 200 determines if a first condition is satisfied. $P_{oil}$ may include an oil pressure at an OPA cam actuator.

Figure 3B:
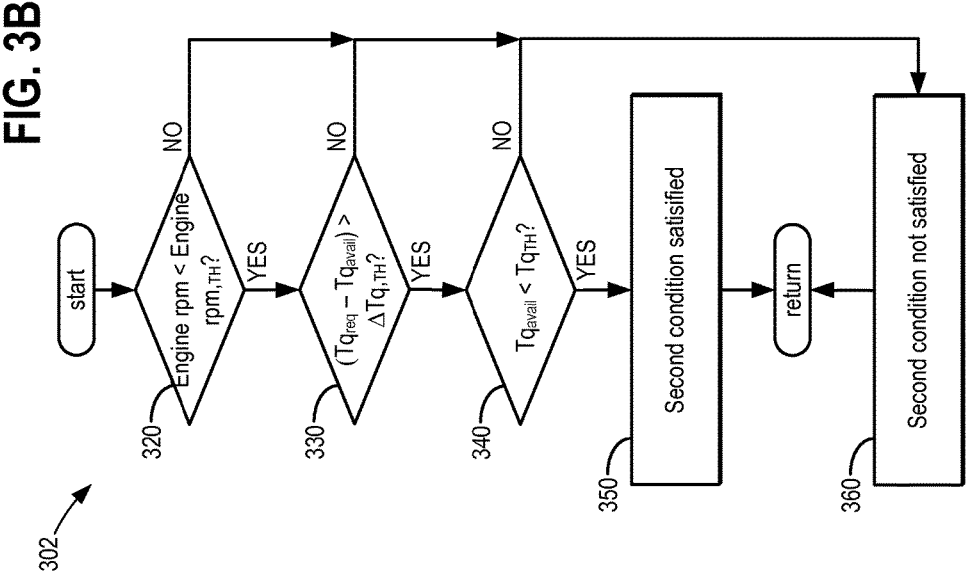
Figure 3A:
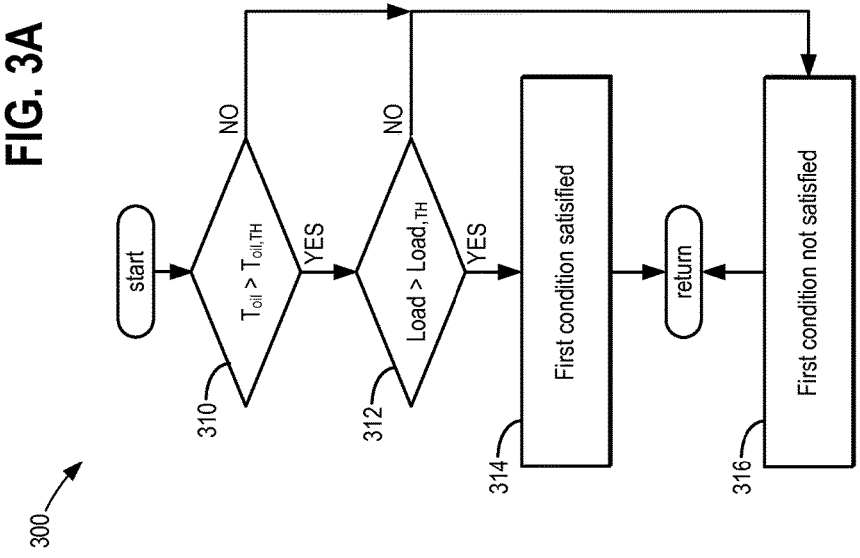

Determining if the first condition is satisfied is evaluated by method 300 of FIG. 3A. Method 300 begins at 310, where it is determined if an oil temperature is greater than a threshold oil temperature, $T_{oil,TH}$. As an example, the threshold oil temperature, $T_{oil,TH}$, may be predetermined based on the viscosity index of the oil, and may correspond to a temperature above which an oil pressure falls below a first threshold oil pressure, $P_{oil,TH1}$. In this way the oil pressure may be inferred by the oil temperature and/or the engine speed. Alternately, instead of inferring the oil pressure from the oil temperature, at 320, method 300 may determine if the oil pressure is less than a first threshold oil pressure, $P_{oil,TH1}$. Below $P_{oilTH1}$, a cam repositioning reliability may be reduced, and cam repositioning may be restricted or partially restricted to maintain vehicle drivability, vehicle operability, fuel economy, vehicle emissions, and the like.

If the oil temperature is greater than the threshold oil temperature (alternately, if the oil pressure is less than a threshold oil pressure), method 300 continues at 312 where it determines if the engine is operating at increased load. For example, the engine may be operating at an increased load if the load is greater than a threshold load, $Load_{TH}$. The threshold load may correspond to a load greater than a load under typical operating conditions, such as towing a heavy trailer up a long incline.

If the load is greater than the threshold load, the first condition is satisfied at 314, and method 300 returns to method 200 at 230 from where it began. If $T_{oil} < T_{oil,TH}$ at 310 or $Load < Load_{TH}$ at 312, then the first condition is not satisfied at 316, and method 300 returns to method 200 at 230 from where it began.

Returning to method 200 at 230, if the first condition is satisfied, then method 200 continues at 232 where the cam movement is restricted. Restricting the cam movement may comprise limiting cam timing adjustments since the inferred oil pressure is low, and cam repositioning may be slow, unstable, or otherwise unreliable. For example, the cam positions may be pinned at the default cam pinned positions in order to maintain vehicle drivability, operability, vehicle emissions, fuel economy, and the like. After 232, method 200 continues at 236 where it determines if a second condition is satisfied.

Determining if the second condition is satisfied is evaluated by method 302 of FIG. 3B. Method 302 begins at 320, where it is determined if an engine speed, engine rpm, is less than a threshold engine speed, engine $rpm_{TH}$. As an example, the threshold engine speed may correspond to an engine stall speed. The engine stall speed corresponds to the engine speed to which an engine can climb when a vehicle is stopped, wherein the torque converter is repressing the engine speed. At the engine stall speed, the engine torque and the engine-side torque of the torque converter are equilibrated. A tight (e.g., low K factor) torque converter prevents an engine speed from reaching substantial engine speeds, and may hinder the engine from building torque when the vehicle is stopped. For example, if the engine stall speed is below 700 rpm or below 1000 rpm, the engine may be hindered from building substantial torque. By increasing low speed engine torque, the engine stall speed can be increased. Alternately, at 320, method 302 may determine if a vehicle is stopped, and engine $rpm_{TH}$ may correspond to an engine rpm when the vehicle is stopped (e.g. vehicle speed is 0). If the engine rpm is less than the engine $rpm_{TH}$, under heavy load conditions (e.g., launching a vehicle towing a heavy load), the engine may not be able to provide enough torque before stalling.

If the engine rpm is less than engine $rpm_{TH}$, method 302 continues at 330 where it determines if a difference between requested torque, $Tq_{req}$, and an available torque, $Tq_{avail}$, is greater than a threshold torque difference, $\Delta Tq_{TH}$. The threshold torque difference may be indicated by an accelerator pedal 130 position (PP) and a vehicle speed or a drive wheel speed. For example, if an accelerator pedal 130 is fully depressed (e.g., $Tq_{req}$ is large) and a vehicle speed is stationary or drive wheel speed is zero (e.g., $Tq_{avail}$ is very small), then the threshold torque difference may be large, exceeding $\Delta Tq_{,TH}$.

If the difference between the requested torque, $Tq_{req}$, and the available torque, $Tq_{avail}$, is greater than the threshold torque difference, $\Delta Tq_{,TH}$, method 302 continues at 340 where it determines if the $Tq_{avail}$ is less than a threshold torque, $Tq_{,TH}$. The threshold torque may correspond approximately an engine torque at an engine stall speed. At the engine stall speed, the engine torque may depend on the torque converter impeller speed, which is equilibrated with the engine speed at engine stall. For example, the k factor of the torque converter relates engine torque to the square of engine speed, and $Tq_{,TH}$ may correspond to the square of the engine speed multiplied by the k-factor. If the available torque is less than the threshold torque, the second condition is satisfied at 350 and method 302 returns to method 200 at 236.

If the engine rpm is not less than the engine $rpm_{,TH}$ at 312, if the $Tq_{req}$–$Tq_{avail}$ is less $\Delta Tq_{,TH}$ is at 330, or if the $Tq_{avail}$ is greater than the $Tq_{,TH}$ at 340, method 302 determines at 360 that a second condition is not satisfied, and method 300 returns to method 200 at 236. In other words, the powertrain control module does not override the oil pressure-based cam repositioning control strategy of controller 12.

Returning to method 200 at 230, if the first condition is satisfied, method 200 continues at 240, where it determines if cam repositioning is reliable. Cam repositioning reliability is determined according to method 400 in FIG. 4. If the second condition is not satisfied at 236, method 200 ends.

Figure 4:
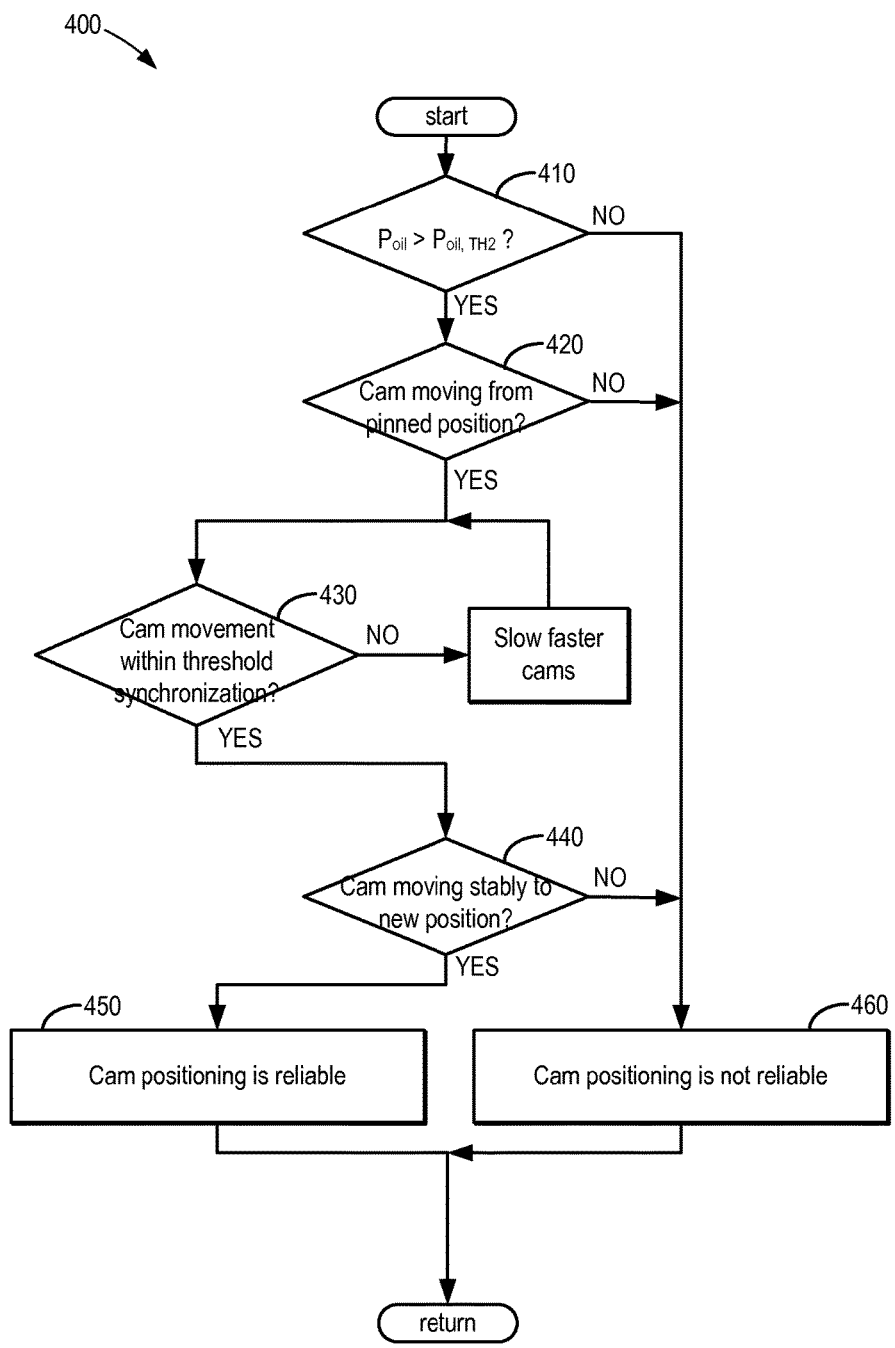

Turning to FIG. 4, method 400 begins at 410 where it determines if the $P_{oil}$ is greater than a second threshold oil pressure ($P_{oil,TH2}$). The $P_{oil,TH2}$ may correspond to an oil pressure high enough to unlock an OPA cam default position pin. For example, $P_{oil,TH2}$ may be 3 psi. In other cases, $P_{oil,TH2}$ may be 6, 8, or 10 psi, depending on the vehicle. $P_{oil,TH2}$ may be lower than $P_{oil,TH1}$. Accordingly, if the $P_{oil}$ is higher than the $P_{oil,TH2}$ but lower than the $P_{oil,TH1}$, controllability of cam repositioning may be reduced. If $P_{oil}$ is less than $P_{oil,TH1}$, the OPA cam default position pins may not be unlocked and the cams may not be repositioned.

At 420, 430, and 440, method 400 evaluates the reliability of the cam positioning control based on the cam controllability itself. In other words, the response of the cam positions to controller 12 is evaluated to determine cam repositioning reliability. As examples, the cam repositioning responsiveness to controller cam repositioning commands can be indicated by movement of a cam from the pinned default position, cams moving within a cam synchronization threshold, and a cam moving stably towards a new position. As an example, the cam synchronization threshold may be six degrees of synchronization between multiple cams. These indicators of cam repositioning responsiveness (e.g., cam controllability) may be measured by the cam position sensor of the VCT system 80.

Returning to method 400 at 410, if the oil pressure is greater than the second threshold oil pressure, method 400 continues at 420. At 420, method 400 determines if a cam can be moved from a pinned position. As an example, controller 12 may transmit a signal to one or more cams 67 via variable cam timing system 80 to determine if the one or more cams move from the pinned default position. As a further example, cam movement from the pinned position may comprise a cam repositioning rate from the pinned position being greater than a threshold cam repositioning rate, and the threshold cam repositioning rate may be set at 30 CA/s, wherein CA/s represents crank degrees/s. When the cam repositioning rate is less than 30 CA/s, the cam controllability and repositioning from the pinned position may be unreliable. If a cam moves from the default position, method 400 continues at 430.

At 430, method 400 determines if cams are synchronously moved within a cam synchronization threshold. Synchronously moving the cams may include having the cam phase angle differences between multiple cams within a cam synchronization threshold. In one example, at 430, the cam synchronization threshold may be six degrees, and method 400 may determine if cams are moved within six degrees of synchronization. Cam position sensor of VCT system 80 may be used to measure cam synchronization. Moving the cams within the cam synchronization threshold may be an indication that the cams can be reliably repositioned. As an example, if the cam movement is not within the cam synchronization threshold, when cams are repositioned, engine performance (e.g. smooth operation of the engine) may be reduced, and an available torque may not be increased. Thus repositioning the cams when the cam synchronization is not within the cam synchronization threshold may not aid in providing increased available torque.

Cams may not be moving within the synchronization threshold when one or more cams are moving faster than one or more other cams. For example, in a V-engine, when repositioning cams, a first bank's cams may move at a faster rate, thereby advancing at a faster rate than the other bank's cams. If at 430, the cam movement is not within the cam synchronization threshold, method 400 proceeds to 436, where controller 12 may reduce the rate of cam movement of the faster cams to reduce the unsynchronization (e.g., reduce cam phase angle differences) in cam movement. Alternately controller 12 may move the slower advancing cams first. In this way, controller 12 may execute a feedback cam repositioning control strategy based on a difference in cam position between cams, rather than based on an absolute cam position, to synchronize the movement of the cams. As a further example, controller 12 cam diagnostics may be conditionally disabled during the second condition in order to provide increased available torque in spite of possibly reducing driveability, fuel economy, increasing emissions, and the like. For instance, in spite of non-ideal cam positioning control (e.g., actual cam positions and rates not corresponding to commanded cam positions and rates), cams may be repositioned to increase engine volumetric efficiency and torque to launch an immobilized vehicle. Furthermore, method 400 performs cam repositioning (e.g. cam movement) to increase available torque even though a rate of cam repositioning may be reduced. In other words, during a second condition, the controller prioritizes increasing cam movement over increasing or maintaining cam movement rate and cam controllability. After 436, method 400 returns to 430 to determine if the cams are synchronized within the synchronization threshold.

If the cams can be synchronously moved within the synchronization threshold, method 400 continues at 440, where it is determined if a cam moves stably to a new position. As an example, stable cam movement may include a cam moving monotonically from the default pinned position to a new cam position. Furthermore, if a cam movement fluctuates between moving from the default pinned position to the new cam position, to moving back towards the default pinned position (e.g. moving away from the new cam position), the cam movement is not monotonic, and the cam is not stably moving towards the new cam position. For instance, when the oil pressure is near to or slightly higher than $P_{oil,TH2}$, cam movement in response to cam repositioning control may fluctuate significantly, despite the oil pressure being high enough to move the cams from the default pinned positions. Furthermore, at low oil pressures near $P_{oil,TH2}$, cam torque pulsation can cause fluctuations in oil pressure that are higher in magnitude than the supply oil pressure to the OPA cams. As a further example, stable cam movement may include the ability of the VCT system to control a cam position within 2 crank degrees of a closed-loop control set point. When the cam position cannot be controlled within 2 crank degrees of a closed-loop control set point, cam movement may be unstable.

Upon determining that one or more cams are moving stably towards a new position, method 400 continues at 450, where method 400 determines that cam repositioning is reliable. In this manner, during a second condition, controller 12 may proceed to reposition the cams to increase available torque when cam controllability, including reduced cam repositioning rates, may be reduced.

If the oil pressure is less than a second threshold oil pressure at 410, the cams do not move from the default pinned position at 420, or the cams do not move stably towards the new position at 440, method 400 determines that cam positioning is unreliable at 460. After 450 and 460, method 400 returns to method 200 at 240.

At 240, if cam positioning is reliable, method 200 continues at 250 where the cams repositioning proceeds. In this manner, during the second condition, cam repositioning control prioritizes increasing cam movement over cam controllability (e.g., the rate of cam repositioning) in order to increase available torque when the available torque is less than the requested torque by more than a threshold torque difference (e.g., insufficient torque to launch a vehicle). Furthermore, faster moving cams may be slowed in order to synchronize cam movement within the synchronization threshold. Accordingly, cam repositioning control is based on a feedback control scheme via cam controllability indicators instead of an open loop control strategy using oil pressure or inferred oil pressure to indicate cam controllability.

Cam repositioning may comprise advancing an intake cam to reduce late intake valve closing and increase available torque, adjusting an exhaust cam to reduce cam overlap, and the like. Additionally, cam repositioning control may further reposition cams to increase an intake vacuum to increase available torque, when a second condition is satisfied. Intake vacuum may be measured by a MAP sensor, as an example. Furthermore, utilizing cam repositioning to reduce intake vacuum deficiencies can reduce or preclude utilization of vacuum pumps in VCT engines, improving fuel economy and/or reducing manufacturing costs.

Returning to 240, if cam positioning is not reliable, then the cams are determined to be uncontrollable and the cams are returned to the default pinned position. After 250 and 256, method 200 continues at 260 where additional actions are taken to increase available torque to the engine. For example, advancing spark timing to maximum brake torque (MBT) timing may increase available torque by synchronizing fuel ignition with piston motion to reduce pumping losses, but reduce drivability. As a further example, shutting off the alternator, decoupling the air conditioning compressor, switching off auxiliary electrical loads, or a combination thereof may be performed to increase available torque from the engine while reducing passenger comfort. As a further example, an oil pump output may be increased and/or an engine oil cooling may be increased to provide a higher oil pressure which may increase torque by increasing cam controllability. Furthermore, a rich air/fuel mixture may be delivered to the engine, to increase available torque despite reducing fuel economy and increasing emissions. In this manner, method 200 may perform additional actions to increase available torque during a second condition despite reducing fuel economy, drivability, and passenger comfort and increasing emissions. In this way, increasing available torque is momentarily prioritized over fuel economy, cam controllability, drivability, emissions, and passenger comfort in response to the second condition. As a result, where a vehicle may be immobilized or unable to operate a front end accessory drive, an available torque and/or intake vacuum can be increased to launch the vehicle or operate the front end accessory drive. Because increasing available torque is momentarily prioritized during the second condition, overall (e.g., over all vehicle driving conditions) vehicle fuel economy, cam controllability, drivability, emissions, and passenger comfort can still be maintained while maintain vehicle manufacturing costs and vehicle manufacturing complexity. After 260, method 200 ends.

In this manner a method may comprise in response to an oil pressure below a threshold oil pressure, and an engine speed below a threshold engine speed, restricting cam movement while the vehicle is moving, and during a vehicle stopped condition, overriding the restricted cam movement. The method may further comprise during the vehicle stopped condition, overriding the restricted cam movement to increase available torque in response to the available torque being insufficient to launch the vehicle, and disabling cam positioning control diagnostics.

The vehicle stopped condition may comprise the oil over-temperature and the load above the threshold load. Furthermore, during the vehicle stopped condition, overriding the restricted cam movement to increase the available torque may be in response to the available torque being insufficient to operate a front end accessory drive.

The method may further comprise, during the vehicle stopped condition, overriding the restricted cam movement to increase an intake vacuum in response to the intake vacuum being insufficient to launch the vehicle, and during the vehicle stopped condition, overriding the restricted cam movement to increase an intake vacuum in response to the intake vacuum being insufficient to operate a front end accessory drive. Overriding the restricted cam movement may comprise advancing an intake cam to increase the available torque, controlling a cam repositioning rate based on a cam position relative to a position of one or more other cams, and controlling a cam repositioning based on a cam response to repositioning commands.

The method may further comprise advancing a spark timing to MBT to increase the available torque, shutting off an alternator to increase the available torque, decoupling an air conditioning compressor to increase the available torque, increasing an oil pump output to increase oil pressure and aid in cam positioning to increase the available torque, increasing delivering a rich air-fuel mixture to the engine to increase the available torque, shutting off auxiliary electrical loads, and increasing an engine oil cooling to reduce oil temperature, increase oil pressure, and aid cam positioning to increase the available torque.

In another embodiment, a method may comprise during a first vehicle moving condition, adjusting cam timing responsive to a requested torque and a requested vehicle speed, but irrespective of an available torque, and limiting cam timing adjustment responsive to oil over-temperature at increased loads, and during a second condition following the first condition, overriding the cam timing adjustment limits in response to the available torque being insufficient to meet the requested torque. The second condition may comprise a non-moving vehicle condition. Furthermore, overriding the cam timing limiting adjustment limits may comprise retarding one or more cams to synchronize cam movement within a cam synchronization threshold, and/or advancing a cam timing to increase the available torque.

Turning now to FIG. 5, it shows an example timeline 500 for repositioning cams for an internal combustion engine during a first and second condition. 510, 520, 530, 536, 540, 550, 560, 570, 580, and 590 are correspond to trend lines for oil temperature, engine speed, requested torque, available torque, requested torque—available torque, oil pressure, cam phase angle difference between multiple cams, valve overlap, air/fuel ratio (e.g. λ), and vehicle speed, respectively. Furthermore, 512 is a threshold oil temperature, $T_{oil,TH}$, 522 is a threshold engine speed, engine rpm,$_{TH}$, 532 is a threshold torque, $Tq,_{TH}$, 542 is a threshold torque difference, $\Delta Tq,_{TH}$, 552 is a second threshold oil pressure $P_{oil,TH2}$, 554 is a first threshold oil pressure $P_{oil,TH1}$, 562 is a cam synchronization threshold, 572 represents zero valve overlap, and 582 represents a stoichiometric air/fuel ratio.

Timeline 500 may represent an example scenario for a vehicle towing a heavy load (e.g., and increased load greater than a threshold load) up a long incline before stopping the vehicle at t1, and then launching and resuming driving after t1. As examples, the vehicle towing a heavy load may be a pickup truck with a heavy-laden bed, or a vehicle towing a heavy trailer. Because of the high load and the long incline, the $T_{oil}$ 510 increases steadily prior to t1 as the vehicle climbs the incline, surpassing $T_{oil,TH}$, 512 at t0. Thus, at t0, a first condition is satisfied, and controller 12 restricts cam movement. For example, cam positions may be pinned at default cam positions 574 in order to maintain vehicle drivability. Because of the rise in $T_{oil}$ 510, $P_{oil}$ 550 steadily drops prior to t1, decreasing below $P_{oil,TH1}$. Prior to t1, engine rpm 520 gradually decreases for example as the engine gears down to increase available torque 536 and as the vehicle speed is reduced while climbing the incline. Just prior to t1, the engine rpm 520 drops below the engine rpm,$_{TH}$ 522. While climbing the incline, the $Tq_{avail}$ 536 closely matches the $Tq_{req}$ 530, such that $Tq_{req}$-$Tq_{avail}$ 540 is close to zero. Although $T_{oil}$ 510 rises above $T_{oil,TH}$ 512, and engine rpm 520 decreases below engine rpm,$_{TH}$ 522, prior to t1, a second condition is not satisfied because $Tq_{req}$-$Tq_{avail}$ 540 is below a $\Delta Tq,_{TH}$. Furthermore, prior to t1, controller 12 is able to achieve a controllability of valve timing and cam timing, wherein the cams are synchronized (e.g., cam phase angle difference 560 is within the cam synchronization threshold 562). Further still valve overlap 570 is positive and decreases as the engine rpm 520 drops and the vehicle decelerates approaching t1. As an example, positive valve overlap can include adjusting the intake valve timing to late intake valve closing to reduce engine pumping losses as the vehicle decelerates to a stop. Prior to t1, a rich air/fuel mixture, represented by λ 580, is delivered to the intake manifold, until just prior to t1 where λ 580 becomes lean as the engine speed 520 drops. Additionally, prior to t1, the vehicle speed 590 gradually decreases as the vehicle decelerates prior to coming to a stop at t1.

At t1, the vehicle is stopped (e.g., vehicle speed is 0), and both $Tq_{avail}$ 536, and $Tq_{req}$ 530 drop below $Tq,_{TH}$ 532. Immediately following t1, $Tq_{req}$ 530 is sharply increased (e.g., an accelerator pedal is depressed) to resume driving, however $Tq_{avail}$ 536 remains below $Tq,_{TH}$ 532. After t1, $Tq_{avail}$ 536 does not increase to match $Tq_{req}$ 530 because the torque converter may stall the engine speed below the engine rpm,$_{TH}$ 522. Furthermore, the cam movement is restricted because $T_{oil}$ is greater than $T_{oil,TH}$ (e.g., oil viscosity is lower as compared to when $T_{oil}$ is less than $T_{oil,TH}$), and $P_{oil}$ is below $P_{oil,TH1}$, controllability of the oil pressure actuated cams may be limited. As an example, the cam positions may move slowly (e.g., for example as compared to when $P_{oil}$>$P_{oil,TH1}$) from the default pinned cam positions, which reduces $Tq_{avail}$, as driving is resumed just after t1. Accordingly, in the example scenario of timeline 500, the vehicle is immobilized after towing a heavy load up a long incline and stopping. As another example scenario, stopping a vehicle after towing a heavy load up a long incline at high altitude can also result in immobilizing the vehicle since intake oxygen rates are reduced and available torque is further decreased.

Accordingly, immediately following t1, when $Tq_{req}$-$Tq_{avail}$ 540 increases above $\Delta Tq,_{TH}$ 542, a second condition is satisfied. In response to the second condition, controller 12 prioritizes increasing available torque to the engine in order to launch the vehicle over maintaining passenger comfort, fuel economy, drivability, and the like. In other example scenarios, controller 12 may prioritize increasing available torque to the engine over maintaining passenger comfort, fuel economy, drivability, and the like in order to run the front end accessory drive. Furthermore, controller 12 may prioritize increasing an intake vacuum over maintaining passenger comfort, fuel economy, drivability, and the like in order to mitigate insufficient intake manifold vacuum.

As an example of prioritizing increasing available torque, controller 12 may reduce the valve overlap 570 to increase engine volumetric efficiency, combustible air intake, and $Tq_{avail}$ at low engine rpm. Furthermore, Controller 12 verifies that the cams can be reliably repositioned by initiating cam repositioning and evaluating cam controllability indicators. Evaluating cam controllability indicators includes comparing $P_{oil}$ 550 to $P_{oil,TH2}$ 552, assessing if the cams can be moved from a default pinned position, determining if a cam phase angle difference 560 is within the cam synchronization threshold 562, and determining if cams move stably towards their new positions. Although $P_{oil}$ 550 is lowered, because of the increased $T_{oil}$, $P_{oil}$ is greater than $P_{oil,TH2}$ 552, and the pinned cams can be unlocked. Furthermore, as indicated by the steady decrease in valve overlap 570 between t1 and t2, the cam positions are movable from the pinned default position, and move stably towards their new positions. As the cam repositioning is initiated between t1 and t2, the cam phase angle difference 560 between multiple cams increases beyond the cam synchronization threshold 562. As an example, the decreased cam synchronization may result from $P_{oil}$ being less than $P_{oil,TH1}$, which can reduce the controllability and movement rates of the OPA cams. To increase the cam repositioning reliability, controller 12 slows the movement of the faster cams after t1, and the cam phase angle difference 560 begins to decrease as time approaches t2. At t2, the faster cams have been sufficiently slowed whereby the cam phase angle difference 560 decreases below the cam synchronization threshold 562. Thus, at t2 controller 12 proceeds with repositioning of the cams to increase available torque since cam controllability indicators indicate that the cams can be reliably positioned.

After t2, controller 12 proceeds with repositioning of the cams, reducing valve overlap to zero, in order to increase available torque. The cam repositioning may proceed slowly because $T_{oil}$ is relatively high (e.g. just after t2, $T_{oil}$>$T_{oil,TH}$)

and $P_{oil}$ is relatively low (e.g., just after t2, $P_{oil}<P_{oil,TH1}$). However, $Tq_{avail}$ increases in response to repositioning of the valves. In addition to repositioning the cams, controller 12 may take further actions to increase available torque. For example, at t2 controller 12 delivers a rich air/fuel mixture (e.g., λ 580 is rich) to the engine intake in order to provide increased $Tq_{avail}$, despite lowering fuel economy. As further examples of prioritizing increasing $Tq_{avail}$, controller 12 may advance spark timing to MBT, shut off the alternator, decouple the air conditioning compressor, and switch off auxiliary electrical loads despite reducing fuel economy, drivability, passenger comfort, or combinations thereof. Further still, controller 12 may increase oil pump speed and/or increase engine oil cooling in order to increase $P_{oil}$ for improving cam controllability and increasing $Tq_{avail}$ despite reducing fuel economy. As a result of the controller 12 actions to prioritize increasing $Tq_{avail}$, $Tq_{avail}$ begins to increase, approaching $Tq_{req}$ between t2 and t3.

At t3, $T_{oil}$ is less than $T_{oil,TH}$, engine rpm is greater than engine $rpm_{TH}$, $Tq_{avail}$ is greater than $Tq_{avail,TH}$ and $Tq_{req}-Tq_{avail}$ is less than $\Delta T_{TH}$. Accordingly, at t3, the second condition is no longer satisfied d con roller 12 ceases prioritizing increasing $Tq_{avail}$ over drivability, fuel economy, passenger comfort, and the like. Furthermore, valve overlap 570 becomes positive as the cams return to their default pinned positions, and the air/fuel mixture (e.g., λ 580) delivered to the engine intake becomes lean.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    operating a vehicle with an oil pressure below a threshold oil pressure, and an engine rotating at a speed below a threshold engine speed;
    in response to the oil pressure below the threshold oil pressure, and the engine rotating at the speed below the threshold engine speed, restricting cam movement of cams by pinning the cams while the vehicle is moving;
    operating the vehicle with a first available torque being insufficient to meet a first requested torque during a first vehicle stopped condition, where the first vehicle stopped condition includes the engine rotating at the speed below the threshold engine speed with the oil pressure below the threshold oil pressure;
    during the first vehicle stopped condition, determining the first available torque, determining the first requested torque, and overriding the restricted cam movement in response to the first available torque being insufficient to meet the first requested torque where overriding the restricted cam movement includes unlocking the cams pinned during restriction of the cam movement, repositioning the cams, reducing engine valve overlap via the cams, and synchronizing the cams;
    operating the vehicle with a second available torque being sufficient to meet a second requested torque during a second vehicle stopped condition; and
    during the second vehicle stopped condition, determining the second available torque, determining the second requested torque, and not overriding the restricted cam movement to continue restricting cam movement in response to the second available torque being sufficient to meet the second requested torque.

2. The method of claim 1, wherein overriding the restricted cam movement includes transitioning from controlling a cam timing in an open-loop manner to controlling the cam timing in a closed-loop manner.

3. The method of claim 2, further comprising advancing a spark timing to MBT to increase the first available torque.

4. The method of claim 2, further comprising shutting off an alternator to increase the first available torque.

5. The method of claim 2, further comprising decoupling an air conditioning compressor to increase the first available torque.

6. The method of claim 2, further comprising increasing an oil pump output to increase the oil pressure and aid in cam positioning to increase the first available torque.

7. The method of claim 2, further comprising increasing a rich air-fuel mixture to the engine to increase the first available torque.

8. The method of claim 2, further comprising increasing an engine oil cooling to reduce oil temperature, increase oil pressure, and aid cam positioning to increase the first available torque.

9. The method of claim 1, further comprising during the first vehicle stopped condition, disabling cam positioning control diagnostics.

10. The method of claim 1, wherein the first vehicle stopped condition comprises an oil over-temperature and a load above a threshold load.

11. The method of claim 1, further comprising, during the first vehicle stopped condition, overriding the restricted cam movement to increase the first available torque in response to the first available torque being insufficient to operate a front end accessory drive.

12. The method of claim 1, further comprising, during the first vehicle stopped condition, overriding the restricted cam movement to increase an intake vacuum in response to the intake vacuum being insufficient to launch the vehicle.

13. The method of claim 1, wherein overriding the restricted cam movement comprises advancing an intake cam to increase the first available torque.

14. The method of claim 1, wherein overriding the restricted cam movement comprises controlling a cam repositioning rate based on a cam position relative to a position of one or more other cams.

15. The method of claim 1, wherein overriding the restricted cam movement comprises controlling a cam repositioning based on a cam response to repositioning commands.

16. The method of claim 1, where unlocking and repositioning the cams during the first vehicle stopped condition includes decreasing synchronization of the cams prior to synchronizing the cams.

17. A method, comprising:
during a first vehicle moving condition, adjusting cam timing responsive to a first requested torque and a first requested vehicle speed, but irrespective of a first available torque, and limiting a cam timing adjustment of cams responsive to an oil over-temperature condition at loads exceeding a load threshold via pinning the cams;
operating in the first vehicle moving condition with the oil over-temperature condition at loads exceeding the load threshold;
during a second non-moving vehicle condition following the first vehicle moving condition, where the second non-moving vehicle condition includes the oil over-temperature condition, determining a second available torque and determining a second requested torque, and overriding the cam timing adjustment limits of the cams in response to the second available torque being insufficient to meet the second requested torque, where overriding the cam timing adjustment limits includes unlocking the cams pinned during the first vehicle moving condition, repositioning the cams, reducing engine valve overlap via the cams, and synchronizing the cams;
operating in the second non-moving vehicle condition with the second available torque being insufficient to meet the second requested torque;
during the second non-moving vehicle condition following the first vehicle moving condition, where the second non-moving vehicle condition includes the oil over-temperature condition, determining a third available torque and determining a third requested torque, and not overriding the cam timing adjustment limits in response to the third available torque being sufficient to meet the third requested torque; and
operating in the second non-moving vehicle condition with the third available torque being sufficient to meet the third requested torque.

18. The method of claim 17, wherein overriding the cam timing adjustment limits further includes advancing a cam timing.

19. The method of claim 17, wherein synchronizing the cams includes retarding one or more of the cams and reducing cam phase angle differences between the cams.

20. A vehicle, comprising:
an engine;
oil pressure actuated cams; and
a controller with executable instructions for:
during a first vehicle moving condition, determining a requested torque and adjusting cam timing of the oil pressure actuated cams responsive to the requested torque and a requested vehicle speed, but irrespective of an available torque, and limiting the cam timing adjustment by pinning the oil pressure actuated cams responsive to determining an oil over-temperature condition at loads greater than a threshold load; and
during a second non-moving vehicle condition following the first vehicle moving condition, where the second non-moving vehicle condition includes the oil over-temperature condition,
determining the available torque and determining the requested torque, and
overriding the cam timing adjustment limits in response to the available torque being insufficient to meet the requested torque during the second non-moving vehicle condition, where overriding the cam timing adjustment limits includes unlocking the oil pressure actuated cams pinned during the first vehicle moving condition, repositioning the oil pressure actuated cams, reducing engine valve overlap via the oil pressure actuated cams, and synchronizing the oil pressure actuated cams, and
not overriding the cam timing adjustment limits in response to the available torque being sufficient to meet the requested torque,
where the engine is spinning during both the first vehicle moving condition and the second non-moving vehicle condition.

* * * * *